Patented July 13, 1943

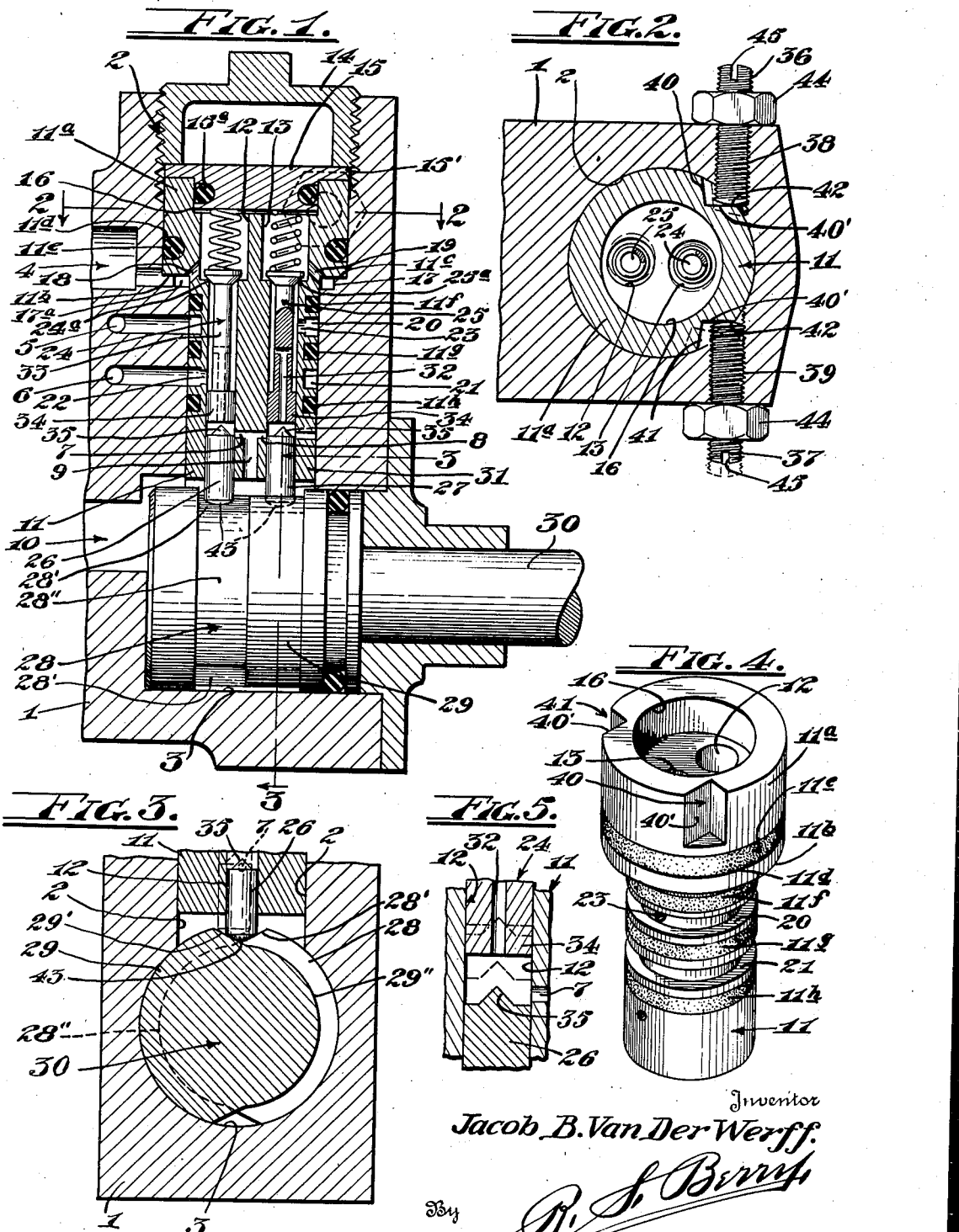

2,323,947

UNITED STATES PATENT OFFICE 2,323,947

ADJUSTABLE HYDRAULIC CONTROL VALVE

Jacob B. Van Der Werff, Pasadena, Calif., assignor to Adel Precision Products Corp., a corporation of California Application August 1, 1942, Serial No. 453,271

12 Claims. (Cl. 137—144)

This invention relates to hydraulic control valves of the type designed for use in aircraft and like vehicles to control the hydraulically operated equipment thereof, such as the rudders, landing and other control flaps, landing gear, bomb doors, gun turrets and the like.

An object of this invention is to provide in a hydraulic control valve of the character described a novel and highly efficient adjusting means which may be readily, easily and accurately manipulated and set to regulate the opening and closing of the valves in response to predetermined movement of the valve operating means to best suit the particular device or equipment with which it is used.

Another object is to provide in a valve such as described an adjusting means which is combined with and related to the valve body and other valve parts in such manner as to facilitate the assembly and the desired setting of the valve members and the operating parts therefor without materially adding weight or requiring added machining operations of a costly nature or appreciably altering the compact arrangement and construction of the valve or interfering with the efficient performance thereof.

A further object of my invention is to provide a hydraulic control valve such as described wherein a combined valve cage and seat member in the form of an insert in the valve body member and which supports cam-actuated push rods, is mounted so that it may be rotated about its major axis to change the position of the push rods with respect to the cam operating means in order that the action of the valve members may be regulated as and for the purposes herein stated; this adjustment being easily effected from the exterior of the valve body at will during or after the assembly of the valve.

Another object of my invention is to provide a control valve such as described wherein the cam-actuated push rods for operating valve members of the valve assembly of themselves in part constitute valve members, whereby such rods have the triple function of serving as actuators for certain of the valve members, as valve members themselves and as adjusting or regulating means for all of the valve members, thereby affording a reduction in the number of separate valve parts required and a consequent cost saving and increase in efficiency of the valve unit.

An important object of this invention is to provide a valve assembly of the character described, wherein the push rods for actuating the pressure valves also act as return valves to control the flow of return fluid, and in addition to being subject to change in position to time the opening of the pressure valve to different degrees of movement of the valve operating means as hereinbefore noted, are responsive to the adjusting means hereof so that they may be set for fully opening the return ports when the pressure valves are closed, to allow free movement of the piston in the hydraulic cylinder controlled by the valve assembly, or set to throttle said ports to retard said flow and the free movement of the piston; or set to close said ports to hydraulic lock said piston.

This invention also resides in the provision of a control valve in which the construction and arrangement of the valve members, their seats and operating means, also that of the valve body member and the bores and passages therein make for a most compact 4-way valve unit which requires less difficult and expensive machining operations than heretofore, reduces weight, is easier to assemble, insures an ample and unrestricted flow of operating fluid and is most reliable as to performance.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a vertical sectional view of a valve unit embodying my invention;

Fig. 2 is a fragmentary horizontal sectional view taken on the line 2—2 of Fig. 1;

Fig. 3 is a fragmentary vertical sectional view taken on the line 3—3 of Fig. 1;

Fig. 4 is a perspective view of the valve seat member;

Fig. 5 is an enlarged fragmentary section of the push rod return valve arrangement showing different adjustments thereof.

Referring more specifically to the accompanying drawing, it is seen that the present embodiment of my invention is carried out in a 4-way hydraulic control valve having a valve body 1 provided with a main valve receiving bore 2 opening at one face of the body and continued into the body to open into a cam shaft receiving bore 3 extending at right angles thereto.

Extending through the body 1 into bore 2 is a pressure fluid intake port 4 adapted to supply fluid to the valve unit from a source of supply of fluid under pressure, not shown. Leading from axially spaced points in the main bore 2 are cylinder ports 5 and 6 which provide for connection with lines, not shown, for conducting fluid to and from a hydraulic cylinder, also not shown.

Return fluid entering the bore 2 follows a course which will be hereinafter described and discharges through return ports 7 and 8, said return ports having a common passage 9 leading therefrom into the cam shaft bore 3. A return fluid outlet port 10 extends from the cam shaft bore 3 out through the body 1 as best seen in Fig. 1, for returning fluid to the source of supply as is well known in this art.

It is now seen that all of the ports extend a comparatively short distance and in straight lines from one surface of the body member 1 into the valve receiving bore and the cam shaft bore, thereby simplifying the machining operation and insuring an ample and unrestricted flow of fluid.

Mounted as an insert within the bore 2 is a cylindrical valve seat member 11 having spaced parallel valve-receiving bores 12 and 13 extending axially therethrough. This seat member has a close working fit in bore 2 and is subject to rotation about its major axis to adjust or regulate the valve action as will be hereinafter more fully described.

A screw plug 14 is threaded into and seals the outer end of the bore 2, there being a flanged sealing disk 15 seated in a counterbore 16 at the outer end of the seat member 11 with its flange 15' lying between and against the plug 14 and outer end of the seat member. The disk 15 is grooved to receive a compressible sealing ring 15a of circular cross section, said ring seating against the wall of the counterbore 16 as best shown in Fig. 1.

The seat member 11 is provided with an enlarged head 11a at its upper end forming a shoulder 11b seating on a shoulder 11c in the bore 2. Above the shoulder 11b is a groove 11d for a compressible sealing ring 11e seating against the wall of bore 2. Similar packing rings 11f, 11g, and 11h are provided on the remainder of the seat member 11 to insure an effective sealing action.

The bore 2 is recessed or counterbored annularly as at 17 to provide an annular space 17a into which the pressure fluid intake port 4 opens. Radial ports 18 and 19 in the seat member 11 afford communication of the port 4 and space 17a with the outer end portions of the valve bores 12 and 13 in the seat member 11 at points spaced somewhat outwardly from valve seats 24a and 25a in said bores.

The two cylinder ports 5 and 6 register with annular grooves 20 and 21 in the seat member 11, there being a port 22 through the member 11 between the groove 21 and the valve bore 12 while a similar port 23 affords communication between the groove 20 and the valve bore 13, these grooves and associated ports being between the return ports 7 and 8 and the valve seats 24a and 25a.

As here provided pressure valves 24 and 25 of the spring loaded poppet type are arranged to be pressure and spring seated against the seats 24a and 25a respectively to selectively control the flow of operating fluid through the bores 12 and 13 and cylinder ports 5 and 6.

Push rods 26 and 27 are mounted in the bores 12 and 13, for operating the valves 24 and 25 and seal the inner ends of said bores. These push rods extend into the cam shaft bore 3 so that they will ride on cams 28 and 29 on a rotary cam shaft 30, and also serve as return valves for controlling the ports 7 and 8. In this connection it is noted that the ports 7 and 8 are in the partition 31 of the member 11, as is also the passage 9 leading from said ports into the cam shaft bore 3. Communication between the return ports 7 and 8 and the ports 22 and 23 is afforded by ports 32 in the stems 33 of the pressure valves 24 and 25. Each of these stems is of such diameter, except at the enlarged lower end 34 thereof, as to afford a free flow of fluid in the bores 12 and 13 with respect to ports 22, and 23. The enlarged ends 34 of the stems operate in and seal the bores 12 and 13 at points between the ports 22 and 23 and the return ports 7 and 8.

The arrangement of the valve stems 33 and the push rods 26 and 27 is such that when the pressure valves 24 and 25 are closed, the upper conical ends 35 of said rods will spaced inwardly from the valve stems regardless of the adjustment of the push rods as will be apparent with reference to Figs. 1 and 5. However, when the cames 28 and 29 are operated to lift the push rods the conical ends thereof will engage in and close the inner ends of the ports 32 in the stems 33 while the stems are lifted by said rods and the pressure valves are opened, as will be hereinafter more fully described. This closing of the ports 32 in the valve stems will prevent pressure fluid flowing out through ports 32 and ports 7 and 8 before the latter are closed by said rods.

The cams 28 and 29 are constructed and arranged so that when one of them, for example cam 28, is operated to cause push rod 26 to unseat the pressure valve 24 so that operating fluid will flow through cylinder ports 22 and 6 leading from valve bore 12, said push rod will close the return ports 32 and 7 in valve bore 12, while the other cam 29 allows the push rod 27 to remain in or assume a position opening return ports 32 and 8 in valve bore 13. Thus the pressure fluid flows through the port 6 while the return fluid flows through port 5 and port 23 into valve bore 13 and out through port 32 in the valve stem of valve 25, return port 8, cam bore 3, and outlet port 10 back to the source of supply of pressure fluid. It is obvious that the turning of the cam shaft in the direction opposite that which brings the cam 28 into play will render cam 29 active and cam 28 inactive, thereby reversing the valve action and the flow as to the cylinder ports and associated valve ports.

In accordance with the present invention means is provided wherein the valve seat member and push rods may be adjusted to regulate the speed of opening and closing of the valve members. This means takes into consideration the turning of the seat member 11 about its axis to shift the push rods with respect to the cams 28 and 29 as indicated for example by the dotted lines in Fig. 2. With reference to Fig. 3 it will be seen that shifting of the push rods in either direction will cause them to ride upward or downward on the rises 28' and 29' of the two cams thereby setting the push rods closer to or farther away from contact with the valve stems 33 and providing for a quicker or slower opening and closing action in consideration of a given degree of rotation of the cams. The adjusting means here employed includes set screws 36 and 37 mounted in screw threaded bores 38 and 39 which lead from opposite sides of the body 1 coaxially into the enlarged upper part of the bore 2 for contact with opposite sides of the seat member 11. It should be noted that the screws 36 and 37 are disposed between the two sealing rings 15a and 11e to prevent leakage. The head 11a of the seat member 11 is provided with recesses or notches 40 and 41 into which the inner ends of the set screws 36 and 37 extend. The inner ends of these set screws are rounded as at 42 and engage flat faces 40' in said recesses, which faces extend substantially at right angles to the axis of the screws, the rounded ends permitting of the necessary relative movement between the rounded ends and said flat faces when the screws are turned to turn the seat member 11 about its axis. This same rounded construction is present as at 43 at the ends of the push rods in contact with the cams to accommodate the shifting of said rods relative to the cams when the seat member is adjusted.

Lock nuts 44 are provided on the set screws 36 and 37, the outer ends of said screws having slots 45 therein for a screw driver or the like.

It should be noted that one extreme adjustment of the seat member 11 will position the inner ends of the push rods 26 and 27 upon the concentric dwells 28" and 29" of the cams 28 and 29, with said rods in the position shown in full lines in Fig. 5, fully opening the return ports 7 and 8 and spacing the outer ends of the push rods the maximum distance from the valve stem and requiring maximum movement of the operating means to open and close the valves. With the ports 7 and 8 fully open the piston of the hydraulic cylinder controlled by the valve assembly may be freely moved back and forth inasmuch as the fluid return lines throughout the system to opposite ends of the cylinder are open when ports 7 and 8 are open.

From the aforementioned extreme adjustment the seat member 11 may be turned to move the push rods into various elevations on the rises 28' and 29' of the cams thus setting the push rods to effect an opening and closing of the valve responsive to different degrees of movement of the operating means and also variously throttling the ports 7 and 8 so that the flow of return fluid may be retarded and the free movement of the piston likewise retarded over an appreciable range of adjustment.

The maximum outwardly adjusted position of the push rods as effected by turning the seat member 11 is indicated by the intermediate dotted lines in Fig. 5 at which time the rods close return ports 7 and 8 to effect a hydraulic locking of the piston and have the minimum spacing from the valve stems so that but a small movement of the cams and associated operated means will effect the opening and closing of the valves. Fig. 5 indicates the practicable limits of adjustment of the push rods as may be effected by the turning of the seat member 11.

When the cam shaft is turned to effect an operation of the valves one of the cams will lift its associated push rod and pressure valve, the lifted push rod then closing the associated return port, while the other cam will allow the other push rod to lower to a position opening the associated return port regardless of the said push rods being set in any position between the limits of their adjustments as effected by the turning of the seat member 11. Thus even if the push rods are set to close both return ports 7 and 8 while both of the pressure valves are closed, when either rod is actuated to open a pressure valve the other rod will be lowered by its associated cam to a position opening associated return port. If the push rods are set to rest on the dwells 28" and 29" then on a cam effected operation of one rod the other will remain on said dwell in position opening the associated return port.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a hydraulic control valve, a valve body member having a main bore and a cam shaft bore intersecting said main bore, a cam shaft in said cam shaft bore, cam means on said shaft, a cylindrical valve seat member seated in said main bore for turning movement about its major axis, sealing means interposed between the wall of the main bore and said seat member, said seat member having a valve-receiving bore therein and a valve seat in said bore, a valve seated on said seat, a push rod operable in said valve receiving bore for engagement with said valve and said cam means and movable with the turning of said seat member to different positions on contact with said cam means; and means operable exteriorly of said valve body for turning said seat member about its major axis in either direction and setting said push rod in adjusted positions.

2. In a hydraulic control valve, a valve body member having a bore therein, a cylindrical valve seat member mounted in said bore for rotative adjustment in either direction about its major axis, means for sealing the outer end of said bore, means providing a fluid tight seal between the wall of the bore and said seat member, said seat member having a valve receiving bore therein, ports leading to and from the bores in the body and seat members, valve means for controlling the flow of fluid through said bores and ports including a push rod movable with said seat member, cam means in said body member operatively engaged with said push rod; and means for turning said seat member in either direction about its major axis to set the push rod in different positions with respect to said cam means.

3. In a hydraulic control valve, a valve body member having a bore therein, a cylindrical valve seat member mounted in said bore for rotative adjustment in either direction about its major axis, means for sealing the outer end of said bore, means providing a fluid tight seal between the wall of the bore and said seat member, said seat member having parallel valve receiving bores extending therethrough on opposite sides of the longitudinal center line thereof, said body member and said seat member having communicating ports through which fluid passes to and from the bores in the seat member; valves in said valve bores, push rods mounted in said seat member for reciprocable movement in the bores thereof to operate said valves, a cam shaft in said body member, cams on said shaft engaging said push rods; and adjusting means for turning said seat member in either direction about its major axis to correspondingly change the position of the push rods with respect to said cams.

4. In a hydraulic control valve, a valve body member having a bore therein, a cylindrical valve seat member mounted in said bore for rotative adjustment in either direction about its major axis, means for sealing the outer end of said bore, means providing a fluid tight seal between the wall of the bore and said seat member, said seat member having parallel valve receiving bores extending therethrough on opposite sides of the longitudinal center line thereof, said body member and said seat member having communicating ports through which fluid passes to and from the bores in the seat member; valves in said valve bores, push rods mounted in said seat member for reciprocable movement in the bores thereof to operate said valves, a cam shaft in said body member, cams on said shaft engaging said push rods; adjusting means for turning said seat member in either direction about its major axis to correspondingly change the position of the push rods with respect to said cams; and means for locking said seat member in adjusted position.

5. In a hydraulic control valve, a valve body member having a bore therein, a cylindrical valve seat member mounted in said bore for rotative adjustment in either direction about its major axis, means for sealing the outer end of said bore, means providing a fluid tight seal between the wall of the bore and said seat member, said seat member having parallel valve receiving bores extending therethrough on opposite sides of the longitudinal center line thereof, said body member and said seat member having communicating ports through which fluid passes to and from the bores in the seat member; valves in said valve bores, push rods mounted in said seat member for reciprocable movement in the bores thereof to operate said valves, a cam shaft in said body member, cams on said shaft engaging said push rods; and adjusting means for turning said seat member in either direction about its major axis to correspondingly change the position of the push rods with respect to said cams, including set screws adjustable axially in the body, said seat member having recesses presenting faces substantially at right angles to the axes of said set screws and against the inner ends of said screws.

6. In a hydraulic control valve, a valve body member having a bore therein, a cylindrical valve seat member mounted in said bore for rotative adjustment in either direction about its major axis, means for sealing the outer end of said bore, means providing a fluid tight seal between the wall of the bore and said seat member, said seat member having parallel valve receiving bores extending therethrough on opposite sides of the longitudinal center line thereof, said body member and said seat member having communicating ports through which fluid passes to and from the bores in the seat member; valves in said valve bores, push rods mounted in said seat member for reciprocable movement in the bores thereof to operate said valves, a cam shaft in said body member, cams on said shaft engaging said push rods; and adjusting means for turning said seat member in either direction about its major axis to correspondingly change the position of the push rods with respect to said cams, including set screws adjustable axially in the body, said seat member having recesses presenting faces substantially at right angles to the axes of said set screws and against the inner ends of said screws, said set screws being coaxial; and lock nuts on said screws adapted to lock against outer surfaces of said body member.

7. In a hydraulic control valve, a valve body member having a bore therein, a cylindrical valve seat member mounted in said bore for rotative adjustment in either direction about its major axis, means for sealing the outer end of said bore, means providing a fluid tight seal between the wall of the bore and said seat member, said seat member having parallel valve receiving bores extending therethrough on opposite sides of the longitudinal center line thereof, said body member and said seat member having communicating ports through which fluid passes to and from the bores in the seat member; valves in said valve bores, push rods mounted in said seat member for reciprocable movement in the bores thereof to operate said valves, a cam shaft in said body member, cams on said shaft engaging said push rods; adjusting means for turning said seat member in either direction about its major axis to correspondingly change the position of the push rods with respect to said cams, and portions on said push rods acting as valves to control certain of said ports.

8. In a hydraulic control valve, a valve body member having a bore therein, a cylindrical valve seat member mounted in said bore for rotative adjustment in either direction about its major axis, means for sealing the outer end of said bore, means providing a fluid tight seal between the wall of the bore and said seat member, said seat member having parallel valve receiving bores extending therethrough on opposite sides of the longitudinal center line thereof, said body member and said seat member having communicating ports through which fluid passes to and from the bores in the seat member; valves in said valve bores, push rods mounted in said seat member for reciprocable movement in the bores thereof to operate said valves, a cam shaft in said body member, cams on said shaft engaging said push rods; and adjusting means for turning said seat member in either direction about its major axis to correspondingly change the position of the push rods with respect to said cams, said seat member having separate ports opening into said valve receiving bores, and valve members on said push rods operative to close said separate ports when the push rods are operated to open the first-mentioned valves and to open said separate ports when the push rods are operated to close said first-mentioned valves.

9. In a hydraulic control valve, a body member, a cylindrical seat member mounted in said body member for rotative adjustment and having valve receiving bores extending axially therethrough, said body member and seat member having ports through which fluid passes to and from said bores, valves for controlling certain of said ports, stems on said valves extending into said bores, a cam shaft operative in said body, cams on said shaft, push rods seated on said cams and mounted in said bores for movement into and out of contact with said valve stems responsive to movement of said cams, certain of said ports in said seat member being opened and closed by said push rods responsive to cam effected movement thereof, and adjusting means for turning said seat member and moving said rods on said cams to adjust said rods from positions in which said certain ports are opened to a position closing said certain ports yet spaced from contact with said stems.

10. In a hydraulic control valve, a body member, a cylindrical seat member mounted in said body member for rotative adjustment and having valve receiving bores extending axially therethrough, said body member and seat member having ports through which fluid passes to and from said bores, a pair of valves in axially spaced relation in each of said bores for controlling said ports, and means operable exteriorly of said body member for turning said seat member in either direction, and operating means for said valves including elements which in response to the turning of said seat member will be adjusted to vary the amount of movement of said operating means required to open and close said valves.

11. In a hydraulic control valve, a body member having ports therein for the passage of fluid into and out of said body member, pressure valves for controlling the flow of pressure fluid through certain of said ports, push rods for operating said pressure valves, said push rods acting as return valves to control the flow of return fluid in other of said ports, cam means in said body member for operating said push rods, and means operable on the exterior of said body member for adjusting said push rods relative to the cams and holding said rods in adjusted positions to time the opening and closing of said valves.

12. In a hydraulic control valve, a body member having a main bore therein and a cam shaft bore intersecting the main bore, a cylindrical seat member mounted in said main bore and provided with valve-receiving bores extending axially therethrough, and provided with valve seats, said body member having a pressure fluid intake port, said seat member having an intake port leading from the intake port in the body member into said valve-receiving bores at points between the valve seats and certain ends of said bores, pressure valves arranged in said bores to seat against said valve seats, stems on said valves extending into said valve-receiving bores, enlarged ends on said stems closing said bores, ports in said body member and seat member leading from said valve-receiving bores at points between the valve seats and the enlarged ends of the valve stems for supplying pressure fluid to and returning fluid from a hydraulic cylinder, ports formed in said stems for passing fluid through said enlarged ends of the stems, return ports in said seat member leading from points between the other ends of said valve-receiving bores and said enlarged ends, into said cam shaft bore, said body member having an outlet for return fluid leading from said cam shaft bore, a cam shaft in said cam shaft bore, cams on said shaft, push rods engaged with said cams, and extending into said valve receiving bores for contact with said stems, said push rods acting as return valves for controlling said return ports and operating to close the ports in said stems when engaged with said stems, and adjusting means operable exteriorly of said body member for turning said seat member in either direction to set the push rods in different positions relative to said cams.

JACOB B. VAN DER WERFF.